Jan. 31, 1939. L. MILLER 2,145,363
PRESSURE INDICATING MECHANISM FOR MOTOR VEHICLE TIRES
Filed June 25, 1936
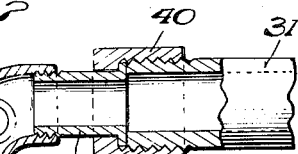
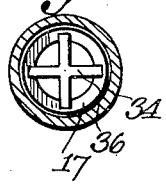
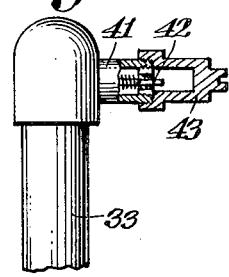
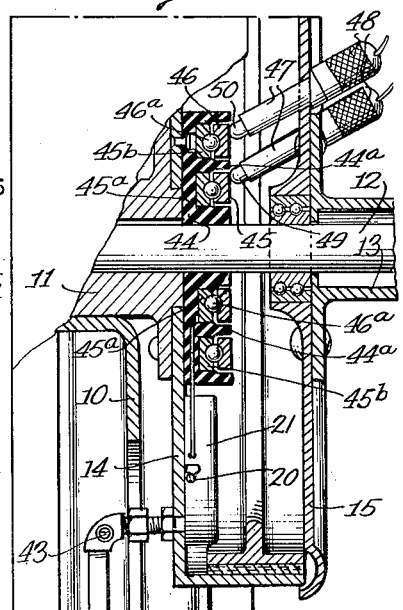
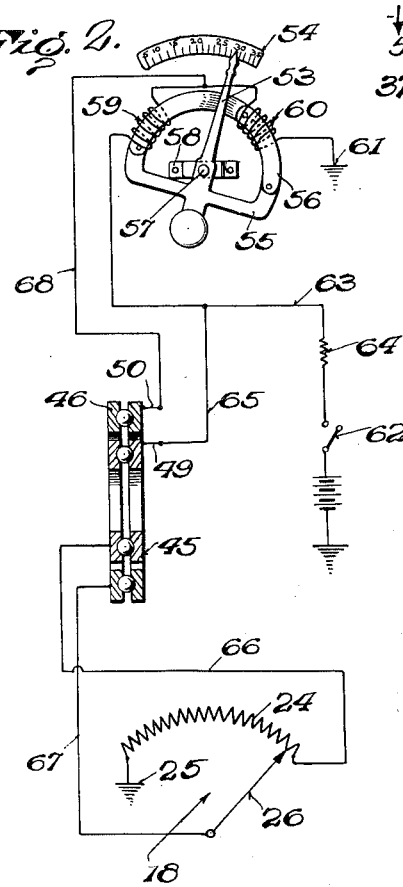
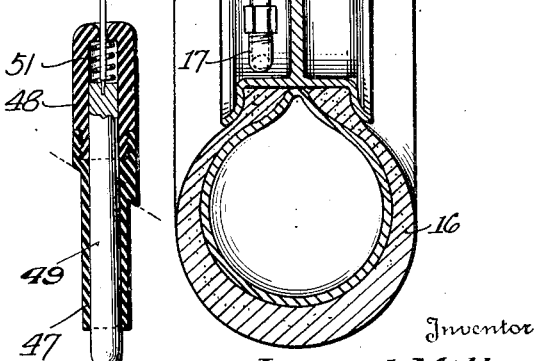
Inventor
Leonard Miller
By Thos. H. Johnston
Attorney Patented Jan. 31, 1939

2,145,363

UNITED STATES PATENT OFFICE 2,145,363

PRESSURE INDICATING MECHANISM FOR MOTOR VEHICLE TIRES

Leonard Miller, Brownwood, Tex.

Application June 25, 1936, Serial No. 87,323

2 Claims. (Cl. 173—324)

This invention relates to an improved pressure indicating mechanism for motor vehicle tires and seeks, among other objects, to provide a mechanism which may be readily embodied in the construction of a motor vehicle and which, when the ignition switch of the vehicle is closed, will serve at all times to visibly indicate, in pounds, the air pressure in each of the tires of the vehicle.

A further object of the invention is to provide a mechanism wherein variations in air pressure in each of the tires will be utilized to actuate a variable resistance unit in circuit with an electrically actuated needle to, in turn, control the movement of the needle for indicating the air pressure existing in the tire.

Another object of the invention, in this connection, is to provide unique and novel circuit connections between the indicating needle and the variable resistance unit.

And the invention seeks, as a still further object, to provide a mechanism which will be accurate and dependable so that the driver of a vehicle may be reliably informed at all times of any need for additional air in any one of the tires of the vehicle whereby wear on the tires from under-inflation may, in so far as possible, be avoided.

Other and incidental objects of the invention not specifically mentioned in the foregoing will appear during the course of the following description and in the drawing which form a part of this application.

Figure 1 is an enlarged fragmentary sectional view through one of the wheels of the vehicle, particularly showing the circuit connections.

Figure 2 is a diagrammatic view showing a typical circuit and connections, as employed for each tire.

Figure 3 is a detail section showing the air connection with one of the vehicle tires.

Figure 4 is a fragmentary elevation showing one of the inflation nipples.

Figure 5 is a section on the line 5—5 of Figure 3.

Figure 6 is a detail section of one of the contact plungers employed.

Referring now more particularly to the drawing, and especially to Figure 1 thereof, one of the wheels is conventionally shown at 10, the wheel being provided with the usual hub 11 journaled upon an axle 12. The axle housing is indicated at 13 while the usual brake drum is indicated at 14, said drum being mounted to turn with the wheel. Closing the drum is the customary stationary housing plate 15 which, in the instance shown, is fixed to the axle housing 13. The wheel tire is indicated at 16 and extending from the inner tube of the tire is the usual inflating stem 17.

In carrying the invention into effect, I employ a conventional variable resistance unit enclosed within an insulating cover 21, the unit being fixed to the brake drum 14. The insulating cover is provided with slots 22 to accommodate studs 20 for removably locking the cover over the unit.

Detachably connected to the stem 17 of the tire 16 is a tube 33 and swiveled upon said tube, as particularly shown in Figure 3 of the drawing, is a nut 34 screwed over said stem. The usual valve of the stem 17 is indicated at 35 and confined between the tube 33 and said stem is a spider 36 having a stud 37 to engage said valve and maintain the valve open. At its upper end the tube 33 carries an elbow 38 in which is screwed a nipple 39 and swiveled upon said nipple is a nut 40 screwed over the adjacent end of the post 31 for detachably connecting the tube 33 with said post. Thus, as will be seen, air pressure in the tire 16 will be communicated to the variable resistance unit. Extending laterally from the elbow 38, as best shown in Figure 4 of the drawing, is a nipple 41 in which is mounted any approved air valve 42 and screwed over said nipple is a cap 43. As will be perceived, the cap 43 may be removed when a hose may be applied to the nipple 41 for inflating the tire 16.

Appropriately fixed within the brake drum 14, as best seen in Fig. 1 of the drawing is an annular insulating disk 44 having inner and outer annular grooves therein which are separated by the annular dividing wall 44a. The walls of the grooves are cut away for substantially half the depth of the grooves to provide a portion thereof which is of greater width than that half of the groove adjacent the bottom, all for a purpose to be presently explained. Disposed within each of the annular channels are race rings 45a and 45b which are suitably fixed thereto for rotation with the insulating disk 44 as it travels with the brake drum. Coacting exposed race rings 45 and 46 are loosely disposed in the insulating disk grooves in that portion thereof which is of greater width than the portion into which the rings 45a and 45b are disposed. The rings 45 and 46 are in electrical contact with the fixed rings through the medium of ball bearings 46a which are placed between and in contact with the two sets of coacting rings. The exposed race rings are loosely mounted in the grooves of the disk and are adapted to remain stationary while the rings 45a and 45b are rotating.

The means I employ to restrain the race rings 45 and 46 against rotation with the rings 45a and 45b comprises a pair of tubular casings 47 which project through the housing plate 15 and are fixed thereto. The tubular casings are closed by detachable caps 48, as best seen in Figure 6, which are screwed into the casings, the casings and said caps being formed of suitable insulating material. Slidable within the casings 47 are inner and outer contact plungers 49 and 50 housed by the caps 48 and disposed within the caps behind the plungers are springs 51 urging the plungers forwardly to engage the exposed stationary races of the ball bearings 45 and 46. The plungers will thus hold said races against movement and make efficient electrical contact therewith.

It will thus be apparent that the exposed race rings are restrained against rotation with the rings 45a and 45b by means of the coacting ring contact plungers 49 and 50. Due to the changing conditions which may be encountered I have made the degree of pressure which may be exerted on the plungers variable at will so that, within the practical limits of my invention the force required to maintain the exposed rings stationary is obtainable and an excellent electrical contact will be made.

Arranged upon the instrument board of the vehicle is a pressure indicating unit comprising a plurality of like pressure indicating needles 53, one for each tire, a scale 54 being provided which is suitably calibrated so that the several needles may indicate tire pressure in pounds.

In Figure 2 of the drawing one of the indicating needles 53 is shown in detail. As will be observed, the needle is integral with a frame 55, the needle and frame being preferably formed of aluminum, and fixed to the ends of the frame is an arcuate armature 56 of iron. The needle and frame is pivoted upon a shaft 57 supported by a bracket 58 attached to the panel 52 and suitably fixed to the panel to movably receive the armature 56 therethrough are identical opposed coils 59 and 60 connected in series and wound in opposite directions, both coils being grounded as at 61.

The usual ignition switch of the vehicle is indicated at 62, said switch being connected with the vehicle battery which is grounded at one side, and leading from said switch to the coil 59 is a wire 63 in which is interposed a resistance 64. As the coils 59 and 60 are balanced against each other and since the same voltage is acting on both coils, a variation in battery voltage will act the same on both coils and not disturb the reading of the needle 53. Connecting the wire 63 with the contact plunger 49 is a wire 65 and connecting the revoluble race of the ball bearing 45 with the resistance element 24 of the resistance unit 18 is a wire 66. Connecting the contact 26 with the revoluble race of the ball bearing 46 is a wire 67 and connecting the contact plunger 50 across the coils 59 and 60 is a wire 68 attached in the circuit of the coils at a point therebetween.

As will be observed, when the switch 62 is closed, current will flow from the battery through both of the coils 59 and 60 to the ground 61 and it will be assumed that the air pressure in the tire has been raised to move the contact 26 to the position shown. Accordingly, current will flow through the wires 65 and 66, the contact 26 and thence through the wires 67 and 68 and coil 60 to the ground 61 with the result that the needle 53 will be swung to the right, as viewed in Figure 2, for indicating the high air pressure in the tire. As the air pressure in the tire falls, however, the contact 26 will be swung to the left so that more and more of the length of the resistance element 24 will be interposed in the shunt circuit with the result that the needle 53 will be swung to the left by the coil 59 for indicating the reduced air pressure in the tire. The mechanism will thus function, as long as the ignition switch 62 is closed, to at all times accurately indicate the air pressure in the tires of the vehicle.

Having thus described the invention, I claim:

1. In apparatus for completing an electric circuit between a rotatable member and a stationary member, including a disk carried by said rotatable member for rotation therewith, electric circuit conducting elements secured to said disk for rotation therewith, said electric circuit conducting elements being insulated from said rotatable member, and stationary electric circuit conducting elements mounted on said disk in electrical contact with said rotatable electric circuit conducting elements but spaced therefrom, and means disposed between said rotatable and stationary electric circuit conducting elements for making electrical contact therebetween and for permitting free independent movement of the rotatable electric circuit conducting elements relative to the stationary elements, and pressure members carried by said stationary member and extending therefrom in position bearing against said stationary electric circuit conducting elements to restrain them from rotation with said rotatable electric circuit conducting elements and to form an electric contact with said stationary elements for completing the electric circuit from said rotatable member to said stationary member.

2. In apparatus for completing an electric circuit between a rotatable member and a stationary member, including an insulating disk secured to said rotatable member and provided with annular grooves, ball bearings having races seated and secured within the annular grooves of said insulating disk, coacting races received within but free from said annular grooves of said insulating disk, plunger casings secured to said stationary member, spring pressed plungers received in said plunger casings and engaging said coacting races to restrain them against movement, and whereby an electric circuit is completed between said races secured to said insulating disk and said plungers.

LEONARD MILLER.